United States Patent [19]

Kooi

[11] 4,084,327

[45] Apr. 18, 1978

[54] THEODOLITE ADJUSTING MEANS

[75] Inventor: J. Peter E. Kooi, Succasunna, N.J.

[73] Assignee: Keuffel & Esser Company, Morristown, N.J.

[21] Appl. No.: 715,602

[22] Filed: Aug. 18, 1976

[51] Int. Cl.² ............................................. G01C 1/00
[52] U.S. Cl. ....................................... 33/299; 33/281
[58] Field of Search ................ 33/299, 282, 281, 283, 33/285, 284, 1 S

[56] References Cited

U.S. PATENT DOCUMENTS

| | | | |
|---|---|---|---|
| 2,132,170 | 10/1938 | Langsner | 33/299 |
| 2,280,057 | 4/1942 | Brunson | 33/299 X |
| 2,531,252 | 11/1950 | Brunson | 33/299 |
| 2,757,567 | 8/1956 | Hillmam et al. | 33/281 X |

FOREIGN PATENT DOCUMENTS 257,765  4/1949  Switzerland ........................... 33/282

Primary Examiner—William D. Martin, Jr.
Attorney, Agent, or Firm—Lionel N. White

[57] ABSTRACT

Telescope elevation controls in a geodetic instrument include coaxially mounted control knobs which respectively effect positive clamping of a lever arm member to the telescope axle, and fine adjustment drive of telescope elevation. Kinematic bearing means are also provided along with telescope plumb line adjustment means capable of effecting true vertical telescope axle adjustment.

7 Claims, 7 Drawing Figures

THEODOLITE ADJUSTING MEANS

BACKGROUND

Fine adjustment mechanisms for geodetic instruments, such as theodolites and transits, in the past have generally comprised a pair of control elements, such as knobs or levers, mounted on the instrument to separately effect a locking of alidade or telescope axle bearing means and a driving of the alidate or telescope through small angles of rotation by the application of a thrusting force directed tangentially of the rotational path of those elements of the instrument. Typical of this type of mechanism are those to be observed in U.S. Pat. No. 2,132,170. The disadvantage of such arrangements of separate locking and tangent screw drive control means is apparent in the requirement for the operator to interrupt his target observation in order to locate the appropriate control member for the desired adjustment.

More recently, locking and fine adjustment controls have been combined into coaxial mounting which to some extent has obviated the clumsy nature of the separate control elements. Such previous coaxial arrangements have, however, been particularly hampered in their utility by the requirement for at least one of the control fixtures, usually the locking mechanism, to comprise an extended mechanical drive train. Such a mechanism was thus limited in for additional adjustment of lines of sight, usually through means for shifting the telescope bearing seating, it has been a common requirement that locking and fine adjustment mechanisms afford a substantial degree of flexibility and freedom of movement in order to accommodate such bearing adjustments. Mechanical drive trains in previous geodetic instruments have lacked the necessary combination of flexibility while retaining quick and positive response to applied locking and fine adjust motions.

A further disadvantage in earlier telescope bearing adjustment means results from the common use of shaft eccentric motions which, of necessity, impart a slight horizontal motion to the axis of the telescope axle in addition to the desired vertical axis movement necessary to correct misalignment of telescope line of sight plumb. Telescope axle bearing mounting and adjustment means of the present invention provides a substantially true vertical shift in the telescope axle, thereby obviating compound misalignment inherent in earlier eccentric bearing adjustment arrangements.

While the requisite stability of a fine adjustment drive train was previously dependent upon close tolerance bearings and mechanical conjoint fittings, the drive mechanism in the present invention exhibits exceptional stability despite the fact that it employs a fixture bearing assembly of extremely loose tolerance. The kinematic balance achieved in this structure results in a surprising degree of firm, smooth, and repeatable fine adjustment operation. The lack of close tolerance elements and machining in this fixture bearing makes possible a great reduction in manufacturing and assembling costs and, in addition, yields a bearing which requires substantially no maintenance, yet resists wear over exceptionally long periods of use.

DRAWINGS

DESCRIPTION

Figure 1:
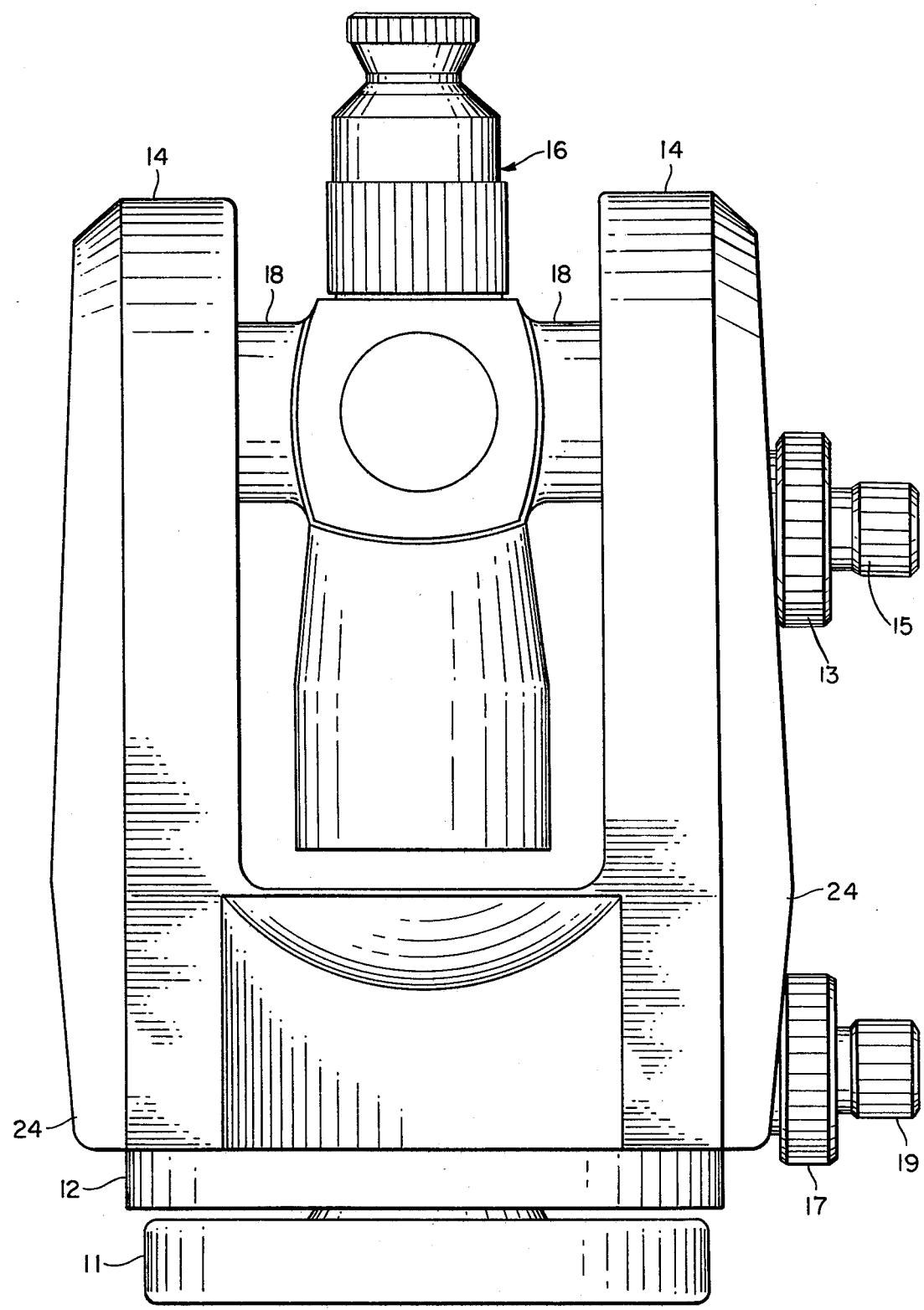
FIG. 1 is an elevational view of an instrument representative of a typical theodolite in present use. A portion of the alidade standard which normally houses the elements of the present invention has been presented in greater detail in FIG. 2.

A typical geodetic instrument, a theodolite, is shown in FIG. 1 and includes an alidade comprising a base 12 which carries a pair of upright standards 14 and a telescope 16 mounted on an axle 18 which is journalled in bearings affixed to the standards 14, thus providing for the rotation of the telescope about the axis of axle 18 in order to effect a vertical plane sweep of the line of sight of the telescope.

The theodolite alidade is supported by a central spindle upon a leveling platform 11, the adjustable leveling feet of which are not shown, and is normally free to rotate about the spindle axis. Cover plates 24 affixed to the standards of the alidade complete a dust-proof enclosure for optical and mechanical elements of the theodolite while providing access to such elements for assembly, adjustment and the like.

Typically supported by a cover plate 24 are control knob sets 17, 19 and 13, 15, which in the depicted embodiment of the instant invention comprise a locking knob 17 for the alidade spindle bearing and azimuth fine adjustment knob 19, and a telescope axle bearing locking knob 13 and elevation fine adjustment knob 15.

A portion of the right hand standard outlined in phantom in FIG. 1 typically houses the telescope elevation locking and fine adjustment mechanisms. That portion of the depicted theodolite standard has been removed and is represented in greater detail in FIG. 2.

Figure 2:
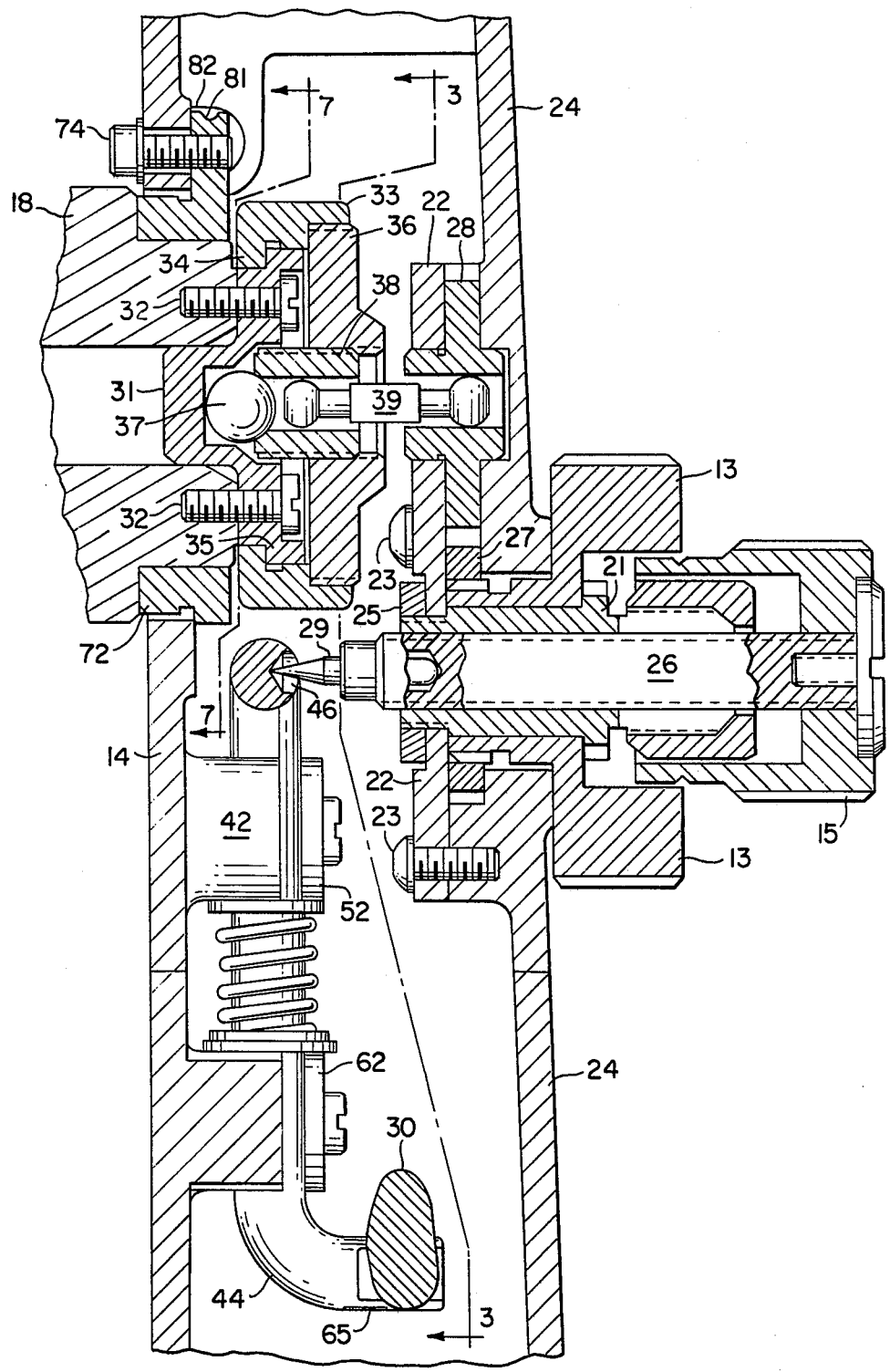
FIG. 2 is a fragmentary elevational view taken in section at 2—2 (FIG. 3) of the alidade portion removed from FIG. 1 showing the locking and fine adjustment mechanism elements of the present invention.
Figure 3:
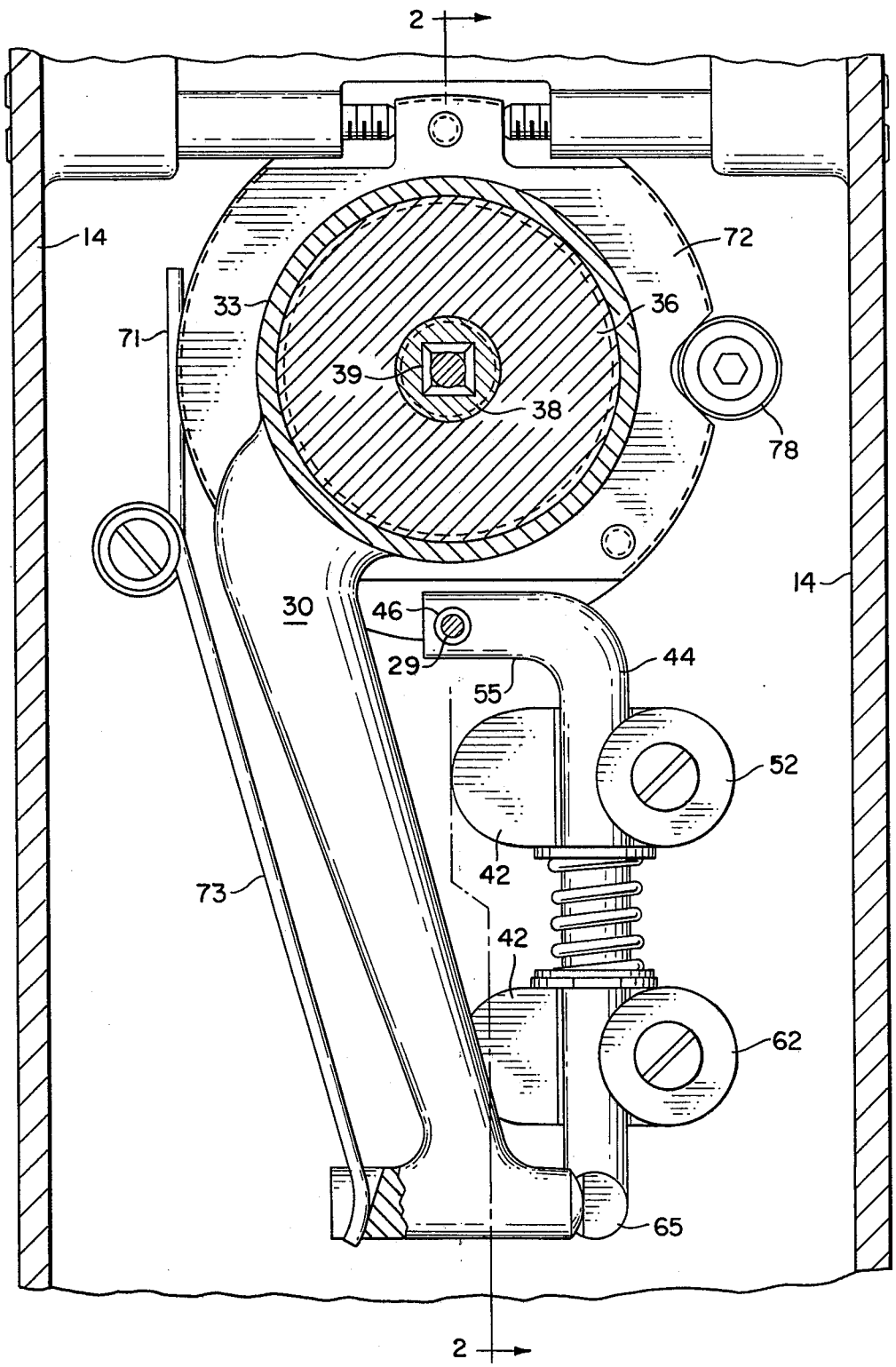
FIG. 3 is a side elevation view taken in partial section at 3—3 (FIG. 2) showing the locking and fine adjustment mechanism elements, as well as the plumb line adjustment bearing mount of the present invention.

The preferred construction of the present invention, thus presented in detail in FIG. 2, comprises a bearing plate 22 which is affixed to standard cover plate 24 by means of cap screws 23. An axially tapped stud 21 is received in bearing plate 22 and retained by collar 25 to provide a stub bearing upon which is journalled the telescope axle lock control knob 13.

Carried upon the splined shaft end of knob 13 is a spur gear 27 which constitutes the primary drive element, moving with force applied to knob 13, for the mechanical train which effects the locking of the fine adjust mechanism to the telescope axle 18. A second spur gear 28 is journalled in bearing elements of bearing plate 22 and standard cover plate 24 and is meshed with gear 27 to be driven with rotation of locking knob 13.

Elevation fine adjust control knob 15 is affixed to one end of threaded rod 26 which is received in the tapped bore of stud 21 and moves axially with rotation of fine adjust knob 15. A bore in the other end of rod 26 loosely receives a rod or pin 29 which comprises the axial drive link of the fine adjust mechanical train, as described in greater detail below.

A butt plate 31 is firmly affixed to the end of telescope axle 18 as by cap screws 32. Encompassing plate 31 is the head portion 33 of elevation arm member 30, an annular flange 34 of which engages shoulder portion 35 of plate 31.

Firmly threaded into head portion 33 of arm member 30 is a bushing plate 36. The assembly of elevation arm member head portion 33 and bushing plate 36 thus enclose the shoulder portion 35 of butt plate 31 with some axial tolerance normally allowing rotation of butt plate 31 within the enclosure.

A steel ball 37 is loosely received in a central wall portion of butt plate 31 and serves as a bearing element between the bottom surface of the well and a nipple 38 threaded into the central tapped bore of bushing plate 36. As will be apparent, rotation of nipple 38 resulting in its axial movement in the direction of ball 37 causes it to bear firmly upon the ball. Further rotation of nipple 38 in the same direction thereafter causes bushing plate 36 with affixed arm member head portion 33 to react with opposite axial movement forcing arm member flange 34 into firm engagement with annular shoulder 35. Elevation arm member 30 is thereby locked to butt plate 31 and telescope axle 18 to which the member 30 is thereby locked to butt plate 31 and telescope axle 18 to which the latter is affixed.

A drive link rod 39 provides the rotary motion transfer from spur gear 28 to nipple 38. Link rod 39 comprises end segments which are of rectangular cross section and respectively loosely received in central rectangular cross section channels of gear 28 and nipple 38. Thus, rod 39 provides positive transfer of rotary motion in both clockwise and counterclockwise directions, yet retains full freedom of axial movement between these drive and driven elements while retaining sufficient tilting freedom to accommodate any misalignments of the axial channels of gear 28 and nipple 38. The locking mechanism train may, therefore, be seen to comprise knob 13 with its affixed spur gear 27 enmeshed with gear 28 transferring rotary motion through the flexible linking arrangement of rod 39 to nipple 38 which, bearing upon ball 37, forces a reactive axial movement of the enclosure combination of bushing plate 36 and elevation arm member head portion 33 to firmly engage annular flange 34 upon shoulder 35 of butt plate 31, thereby locking elevation arm member 30 to the telescope axle 18.

Having thus been locked to the telescope assembly, elevation arm member 30 may be utilized to effect the fine adjustment of elevation of the telescope. In a preferred embodiment of the present invention such fine adjustment is effected through a mechanical train which comprises offset bell crank 44 as a means of directly transferring the axial motion of pin 29 to the foot portion of elevation arm member 30. It will thus be apparent that, counterbalanced by torsion spring arm 73, axial motion of pin 29 upon the upper arm lever 55 of offset bell crank 44 will cause the bell crank lower lever arm 65 to cooperate with the foot of arm member 30 to effect fine adjustment of telescope elevation.

Figure 4:
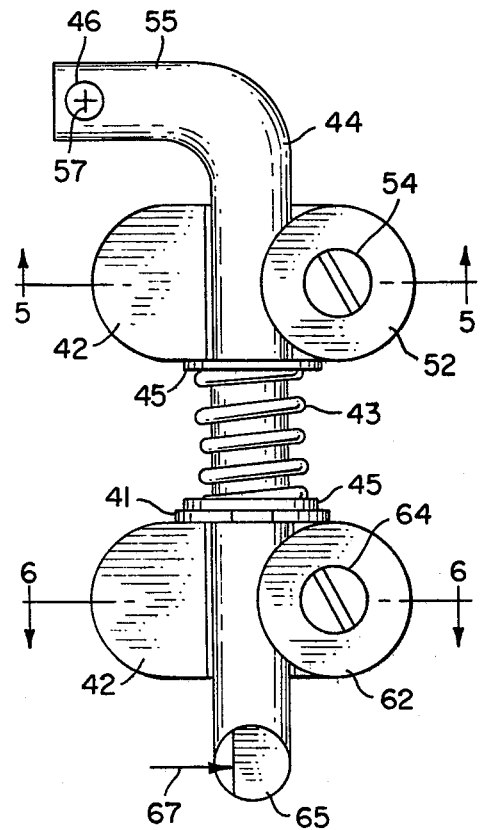
FIG. 4 is a separate side view of the elevation advance translation sub-assembly fixture of the present invention.
Figure 5:
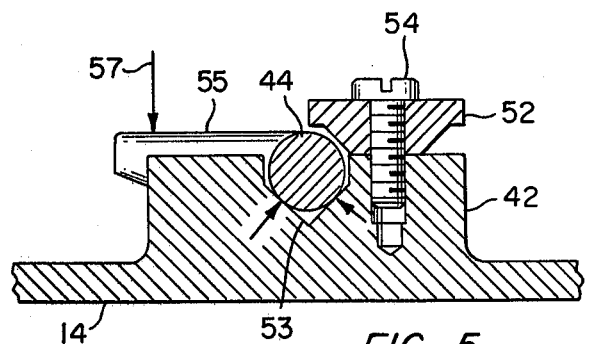
FIG. 5 and FIG. 6 are views taken in section at 5—5 and 6—6 (FIG. 4) showing the kinematic balance of applied forces in the translation fixture bearing arrangement.
Figure 6:
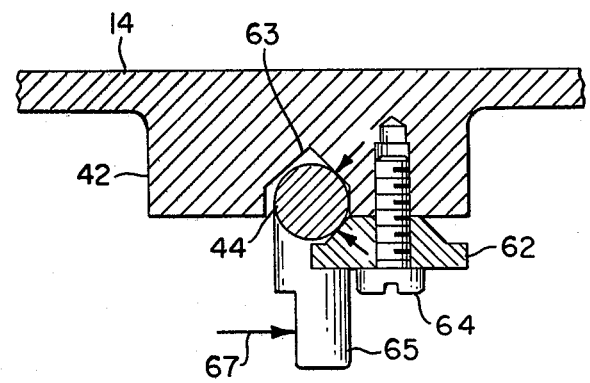

As may be observed in greater detail in FIGS. 4–6, the offset bell crank assembly comprises a pair of bosses 42 on standard 14 each of which includes a substantially vertical V-groove, each groove being disposed in vertical alignment with the other. The main shaft of offset bell crank 44 is cradled in and between the pair of V-grooves 53, 63 of bosses 42 and is restricted from downward axial movement by means of snap ring collar 41. Conical bushings 52, 62, respectively affixed to bosses 42 by cap screws 54, 64 loosely enclose the central shaft of bell crank 44 within the confines of V-grooves 53, 63, yet allow some minute lateral movement of the bell crank shaft within such pair of enclosures. The bell crank assembly is completed by the earlier inserted compression spring 43 which extends between washers 45 to eliminate extraneous longitudinal end play in bell crank 44.

Thus initially assembled, and without a loading force from torsion spring 73, offset bell crank 44 is so loosely encompassed within the pair of bearings formed by grooves 53, 63 and conical bearings 52, 62 as to comprise a "sloppy" fit without apparent means of restrainment to any practical degree. However, when assembly of the fine adjustment mechanical train is completed through the urging of the foot portion of elevation arm member 30 by spring arm 73 into contact with lower lever arm 65, and axial insertion of a rod or pin 29 into bore 46 of upper lever arm 55 of offset bell crank 44, a balance of kinematic forces is effected which results in a surprising and most unexpectedly stable bell crank bearing assembly.

This kinematic balance thus established may be seen as represented in FIGS. 4–6 where the action of pin 29 upon upper lever arm 55 is shown as an applied force 57 which effects a balancing reaction at the tangencies of the central shaft of bell crank 44 with the walls of V-grooves 53, while the action of torsion spring arm 73 acting as an applied force 67 against lower lever arm 65 effects the counterbalancing reaction between the bell crank shaft 44 and its tangencies with one wall of groove 63 and the conical surface of bushing 62. The composite balance of the indicated kinematic forces results in a bearing arrangement which maintains offset bell crank 44 against lateral movement, yet allows rotation of the main shaft with axial movements of shaft 26 and pin 29 in an exceptionally smooth and fluid manner.

The operation of the fine adjustment mechanism will thus be seen to comprise rotation of fine adjust control knob 15 to effect axial movement of threaded rod 26 and its link pin 29 to transfer such movement through offset bell crank 44 to the distal foot of elevation arm member 30 and thence to telescope axle 18 to which it has been locked in the manner earlier described. Reverse motion upon withdrawal of rod 26 is effected by the recovery of spring arm 73.

A further adjustment provided by the arrangement of the present invention is that of line of sight plumb. Such adjustment is necessary to ensure that the telescope line of sight plane is truly parallel to the axis of rotation of the alidade.

Theodolite plumb line adjustment is normally effected by a vertical displacement of one end of the telescope axle. Previous arrangements utilizing eccentric mountings to effect such axle displacement have, however, normally injected into the adjustment an undesirable horizontal vector movement resulting in an azimuth misalignment of the line of sight plumb.

Bearing 72 is adjustably mounted to standard 14 by means of the action of upper torsion spring arm 71 forcing the bearing body into engagement at a peripheral notch 76 with a shoulder washer 77 affixed to standard 14 by means of screw 78. Notch 76 and pivot assembly 77, 78 are substantially horizontally disposed from the axis of telescope axle 18 while arm 71 of the torsion spring mounted on boss 75 extends tangentially in bearing peripheral groove 81 at a point diametrically opposed to pivot screw 78.

A tongue 86 formed in the upper periphery of bearing 72 is engaged on each side by set screws 84 which are threaded in the tapped bores 83 of bosses 82 formed in standard 14. Set screws 84 are accessible from the exterior of standard 14 by removal of plug screws 85. By conjoint opposite movement of screws 84, bearing 72 may be caused to move about screw 78, the tangencies of notch 76 riding upon washer bearing 77 effecting a true pivoting action about the center of screw 78.

Figure 7:
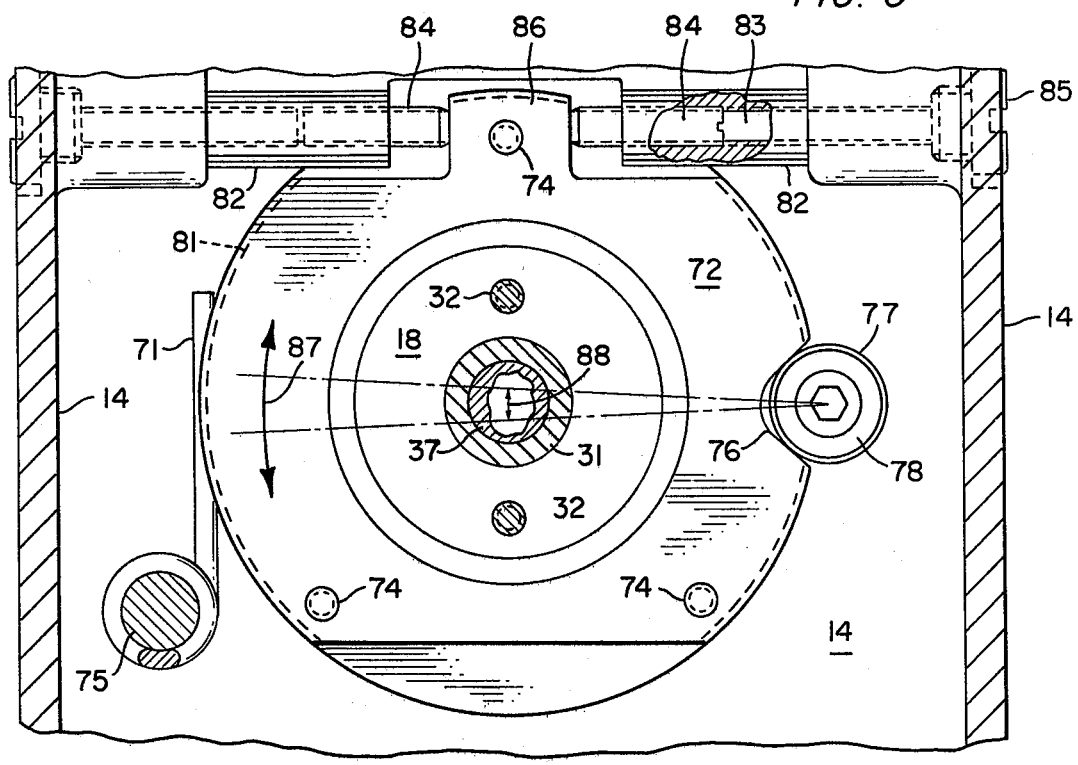
FIG. 7 is a side elevation view taken in partial section at 7—7 (FIG. 2) showing in greater detail the structure and function of the plumb line adjustment bearing mount.

As can be seen in FIG. 7, the long axis of rotation of bearing 72 about pivot screw 78 describes a shallow arc 87 which, translated to the axis of telescope axle 18, is substantially a vertical straight line displacement 88. Thus the adjustment of telescope bearing 72 to achieve line of sight plumb avoids any horizontal vector motion which would otherwise misalign the desired plumb line. Once the desired plumb line has been established, cap screws 74, which as in the case of set screws 84 are wholly accessible from the exterior of the enclosed standard housing, may be firmly set to maintain the line of sight plumb alignment.

Although adjustment of the line of sight plumb of necessity results in a change in alignment between the central channels of spur gear 28 and nipple 38 and, further, displaces the foot of elevation arm member 30, the non-rigid contacts between the toe of the latter and lever arm 65 of the offset bell crank, as well as the universal character of the drive link rod 39, ensure continued smooth and non-binding operation in both the locking and fine adjustment mechanisms of instruments embodying the present invention.

What is claimed is:

1. In a geodetic instrument comprising an alidade including a pair of standard housings and an axle journalled therebetween mounting a telescope for line of sight elevation displacement, the improvement in means for controlling and effecting fine adjustment in said elevation displacement, said improvement comprising:
    (a) means presenting an annular shoulder situated within one of said pair of standard housings and affixed to one end of said axle, said annular shoulder being arranged for coaxial rotation with said axle;
    (b) means presenting an annular flange loosely encompassing said shoulder within the confines of said annular flange and being capable of coaxial rotation and limited axial displacement with respect to said shoulder means, said encompassing means having a threaded axial bore;
    (c) threaded nipple means engaged in said encompassing means axial bore and bearing axially upon said axle end, whereby rotation of said nipple means in a first direction will result in the generation of an axial force acting between said axle end and said encompassing means to effect said encompassing means axial displacement with resulting clutching engagement between said annular shoulder and said encompassing means annular flange portion, thereby fixing said encompassing means to said axle for coaxial rotation therewith;
    (d) first drive means accessible from the exterior of said one housing, whereby a rotary force applied thereto may be transferred to the interior of said housing;
    (e) means linking said first drive means to said nipple means whereby rotation of said nipple means may be effected by application of rotary force to the exterior accessible element of said first drive means;
    (f) a lever arm affixed to said encompassing means and extending radially therefrom within said one housing;
    (g) lever means within said one housing arranged to shift the direction of an applied rectilinear force from one substantially parallel to the axis of said axle to one substantially tangent to a path of circular revolution about said axis, and to transfer said redirected force to said lever arm;
    (h) second drive means accessible from the exterior of said one housing, whereby a rotary force applied thereto may be converted to an axial rectilinear force directed to the interior of said housing; and
    (i) means linking said second drive means to said lever means, whereby displacement of said lever arm and concurrent rotation of said encompassing means therewith may be effected by application of rotary force to the exterior accessible element of said second drive means.

2. The improvement according to claim 1 wherein said lever means comrises:
    (a) a pair of bearing block members outstanding from a wall of said standard housing, each said member comprising a V-groove oriented substantially co-linear with the V-groove of the other said member;
    (b) an offset bell crank member comprising a cylindrical shaft from each extremity of which extends a lever arm portion oriented orthogonally to both said shaft and the other said arm portion, said shaft extending between and being cradled in said block member V-grooves; and
    (c) a bushing member affixed to each said block member loosely overlying said bell crank shaft and containing said shaft within each said V-groove, the shaft-overlying portion of each said bushing member presenting a surface which forms with at least one of the faces of its associated block member V-groove a second shaft-cradling V-body whose bisector plane is substantially perpendicular to the bisector plane of said V-groove, whereby the application of opposing balanced forces normal to the respective lever arm portions of said bell crank will firmly seat said shaft in the respective V-groove of one and V-body of the other of said bearing block members.

3. The improvement according to claim 1 wherein said exterior accessible elements of said first and second drive means comprise a pair of knobs coaxially mounted to said standard housing.

4. The improvement according to claim 1 wherein said second drive means comprises:
    (a) a stud member affixed to said standard housing and having a threaded bore oriented substntially parallel to the axis of said telescope axle communicating with the interior of said housing;
    (b) a threaded shaft received in said stud member bore; and
    (c) a knob affixed to the proximal end of said shaft and accessible from the exterior of said housing.

5. The improvement according to claim 4 wherein said second drive linking means comprises a smooth axial bore in the distal end of said shaft and a rod member loosely contained within said bore and extending axially therefrom.

6. The improvement according to claim 1 which further comprises telescope line of sight plumb adjustment means comprising:
   (a) a bearing journalling one end of said telescope axle and being releasably affixed to a wall of said standard housing, said bearing having a radially extending tongue portion and a peripheral V-notch disposed substantially orthometrically from said torque portion;
   (b) means presenting a substantially circular cylindrical shoulder surface outstanding from said housing wall and situated to tangentially engage both faces of said V-notch;
   (c) means affixed to said standard housing slidably engaging said bearing at a peripheral surface substantially diametrically opposite said V-notch and urging said bearing V-notch faces into firm yet slidable engagement with said shoulder surface; and
   (d) a pair of set screws threadable engaging said standard housing and arranged to apply opposing force vectors upon said bearing torque portion along a line substantially tangential to the periphery of said bearing, whereby coordinate movement of said set screws displacing said torque portion will effect an arcuate displacement of said bearing about the center of curvature of said shoulder surface resulting in a substantially rectilinear displacement of the axis of said telescope axle.

7. The improvement according to claim 6 wherein said shoulder surface center of curvature is situated beyond the circumferential periphery of said bearing.

* * * * *

UNITED STATES PATENT OFFICE
CERTIFICATE OF CORRECTION

Patent No. 4,084,327    Dated April 18, 1978

Inventor(s) J. Peter E. Kooi

It is certified that error appears in the above-identified patent and that said Letters Patent are hereby corrected as shown below:

Column 8, line 7, "torque" to read --- tongue ---.

Column 8, line 10, "torque" to read --- tongue ---.

Signed and Sealed this

Twelfth Day of September 1978

[SEAL]

Attest:

RUTH C. MASON
Attesting Officer

DONALD W. BANNER
Commissioner of Patents and Trademarks